United States Patent
Lerman et al.

(10) Patent No.: US 9,683,466 B2
(45) Date of Patent: Jun. 20, 2017

(54) VALVE FOR INTERNAL COMBUSTION ENGINES AND METHOD FOR OBTAINING A VALVE

(71) Applicants: Mahle International GmbH, Stuttgart (DE); Mahle Metal Leve S/A, Jundiaí (BR)

(72) Inventors: Pedro M. Lerman, Rafaela (AR); Jose V. Lima Sarabanda, Morumbi (BR); Paulo R. Vieira De Morais, São Bernardo do Campo (BR); Romulo P. Fogaca De Almeida, Jundiaí (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 28 days.

(21) Appl. No.: 14/752,827

(22) Filed: Jun. 26, 2015

(65) Prior Publication Data
US 2015/0377089 A1    Dec. 31, 2015

(30) Foreign Application Priority Data
Jun. 30, 2014  (BR) .............. 102014016213

(51) Int. Cl.
| F01L 3/02 | (2006.01) |
| F01L 3/20 | (2006.01) |
| B23P 15/00 | (2006.01) |
| F01L 3/04 | (2006.01) |

(52) U.S. Cl.
CPC .............. *F01L 3/02* (2013.01); *B23P 15/002* (2013.01); *F01L 3/04* (2013.01); *F01L 3/20* (2013.01); *F01L 2103/00* (2013.01)

(58) Field of Classification Search
CPC .... C21D 1/09; C21D 2251/04; B23K 26/066; F01L 1/46; F01L 3/02; F01L 3/04; F01L 3/20; F01L 2103/00; F16K 1/00; F16K 1/32; F16K 1/36
USPC ............ 148/525, 529, 530, 537, 565; 129/121.65, 121.66; 123/188.3, 188.2, 123/188.4
See application file for complete search history.

(56) References Cited

U.S. PATENT DOCUMENTS

| 1,731,202 A | 10/1929 | Phillips | |
| 3,461,001 A | * 8/1969 | Gerhard | C21D 1/08 148/512 |
| 3,952,180 A | * 4/1976 | Gnanamuthu | B23K 26/34 219/121.64 |
| 4,015,100 A | * 3/1977 | Gnanamuthu | B23K 26/34 148/512 |

(Continued)

FOREIGN PATENT DOCUMENTS

| WO | WO-97/43525 A1 | 11/1997 |
| WO | WO-2007/115043 A2 | 10/2007 |
| WO | WO-2014/068662 A1 | 5/2014 |

OTHER PUBLICATIONS

European Search Report for EP15167699.6 dated, Dec. 1, 2015, 3 pp.

*Primary Examiner* — Jason L Vaughan
(74) *Attorney, Agent, or Firm* — Fishman Stewart PLLC

(57) ABSTRACT

A valve for an internal combustion engine may include a ferrous body having a neck. At least one area of the neck may include a surface layer with a thickness of up to 300 μm. The valve may also be provided with at least 17% solubilized metallic chromium, which may be obtained by an application of a surface melting treatment.

10 Claims, 4 Drawing Sheets

(56) References Cited

U.S. PATENT DOCUMENTS

| | | | | |
|---|---|---|---|---|
| 4,073,474 A | * | 2/1978 | Hashimoto | B23K 20/129 123/188.3 |
| 4,117,302 A | * | 9/1978 | Earle | F01L 3/04 219/121.63 |
| 4,182,299 A | * | 1/1980 | Earle | B23K 26/34 123/188.1 |
| 4,243,867 A | * | 1/1981 | Earle | B23K 26/0823 219/121.63 |
| 4,692,191 A | * | 9/1987 | Maeda | B44C 1/005 148/241 |
| 4,750,947 A | * | 6/1988 | Yoshiwara | B23K 26/34 148/512 |
| 5,076,866 A | * | 12/1991 | Koike | C22C 21/00 123/188.3 |
| 5,230,755 A | * | 7/1993 | Pierantoni | C23C 4/08 148/325 |
| 5,370,092 A | * | 12/1994 | Shimizu | F01L 3/02 123/188.11 |
| 5,495,837 A | | 3/1996 | Mitsuhashi et al. | |
| 5,517,956 A | * | 5/1996 | Jette | B23P 15/002 123/188.3 |
| 5,799,683 A | * | 9/1998 | Hamada | C21D 1/09 123/188.3 |
| 6,143,095 A | * | 11/2000 | Kim | C23C 26/02 148/224 |
| 6,843,866 B2 | * | 1/2005 | Brenner | B23K 10/027 148/525 |
| 6,912,984 B2 | * | 7/2005 | Narasimhan | B23P 15/002 123/188.3 |
| 7,246,586 B2 | * | 7/2007 | Hosenfeldt | C23C 14/024 123/90.19 |
| 8,234,788 B2 | * | 8/2012 | Rozario | B22F 7/062 123/188.1 |
| 9,181,824 B2 | * | 11/2015 | Montagnon | C21D 1/10 |
| 9,334,547 B2 | * | 5/2016 | Qiao | C21D 9/0068 |
| 9,464,730 B2 | * | 10/2016 | Bihlet | F01L 3/04 |

* cited by examiner

VALVE FOR INTERNAL COMBUSTION ENGINES AND METHOD FOR OBTAINING A VALVE

CROSS-REFERENCE TO RELATED APPLICATIONS

This application claims priority to Brazilian Patent Application No. 10 2014 016213 5, filed Jun. 30, 2014, the contents of which are hereby incorporated by reference in their entirety.

TECHNICAL FIELD

The present invention relates to a valve for use in an internal combustion engine, as well as the method for obtaining such a valve.

BACKGROUND

Internal combustion engines are heat engines that transform the energy from a chemical reaction into mechanical energy, and use their own combustion gases as a working fluid. They basically comprise two main parts: one or more cylinder heads and the engine block.

The valves of an internal combustion engine are housed in the cylinder head(s) and are intended to allow or block the entry or exit of gases into/from the engine cylinders.

Internal combustion engines contain intake valves which control the entry of gas mixture into the engine cylinder, and exhaust valves which allow the exit of the gases after explosion.

Given the working conditions demanded of such engine components during the operation of internal combustion engines, failure modes are observed in valves, especially in exhaust valves. In particular, one of these failure modes is corrosion, the result of which is extremely damaging to the combustion engine, leading to the loss of its performance and, eventually, engine shutdown with the required maintenance thereof.

Until now, among the most common solutions for lining engine valves of the prior art has been nitriding, which gives a negative performance on fatigue strength, for example. Another example is titanium valves, which are used for racing engines, but have a very high cost and low wear resistance, due to their surface being coated with titanium nitride (TiN) or titanium oxide (TiO) to compensate for low wear resistance.

There are also some additional solutions for engine valves that make use of commercially known alloys like Nimonic or Nireva, but the cost of these materials is not worth the properties offered for most situations.

Although there are various attempts to try to minimize the wear to which the valves are subject, the prior art solutions do not provide an internal combustion engine valve which manages, at the same time, to provide superior performance in all matters of durability.

Thus, one of the phenomena that most affects the durability of prior art valves arises from intergranular corrosion (IGC).

The phenomenon may be described as corrosion that begins at the grain edge. Due to exposure to high temperature, the chromium of the alloy migrates to the grain edge, i.e. the formation occurs of a precipitate of chromium in the grain boundary area. As a result, the loss of chromium as an element of the alloy, essential to corrosion resistance, leads to the dissolution of the grain boundaries and adjacent areas.

Another mechanism of wear that generally occurs in prior art valves is known as Hot Gas Corrosion. Hot gas corrosion to which valves are subject, is, generally, a uniform mechanism of corrosion associated, in most cases, with the hot gases to which exhaust valves are subjected. It is generally related to oxidation, but it may also occur through the attack of molten salts, such as sulphidation (sulphate salts formed by fuel and lubricating fluids).

It should be noted that the valves most affected by hot gas corrosion are exhaust valves, since it is these that receive heat resulting from the explosion in the combustion chamber. More particularly, it is the neck area of the valve that suffers greater wear due to corrosion, since, for reasons of valve geometry, it is this area that is most exposed to hot gases.

However, it should be stressed that this neck area of the valve suffers even more corrosion than other parts due to the manufacturing process of same, given that this is the portion of the valve subjected to the greatest plastic deformations and the need for subsequent heat treatment. Accordingly, the metallic chromium that was initially solubilized in the valve structure with a quantity of at least 17%, can no longer ensure this value and, as a result, is unable to offer the necessary corrosion resistance referred to above.

A third common phenomenon that attacks valves is illustrated in FIG. 11. In this case, a fault in the valve that prevents the rotary movement thereof may result in a small opening that allows the passage of gases from combustion. These gases, in their turn, since they have a high temperature and are corrosive, lead to corrosion in the area of the valve seat.

Such an occurrence prevents the proper seal that the valve has to provide. In some cases localized melting can occur, accelerating the phenomenon of corrosion until the valve fails. This occurs because the constant passage of hot gases drastically increases the temperature in a localized and concentrated area (see arrows in FIG. 11), making it impossible for the valve to provide correct engine operation. It should be noted also that this phenomenon has particular implications when the valve presents sealing problems.

For all the above reasons, until now a valve has not been developed for use in an internal combustion engine, in which at least one of the valve areas (such as the neck) exposed to a corrosive environment has been provided with at least 17% solubilized metallic chromium, providing the valve with high durability, simplified manufacture and resistance to corrosion and fracture.

SUMMARY

A first objective of the present invention is to provide a valve for use in an internal combustion engine, which comprises a neck area provided with at least 17% solubilized metallic chromium, on a surface with a thickness of up to 300 μm.

A second objective is to describe in detail the method of manufacturing a valve for internal combustion engines, in which a surface treatment by melting capable of solubilizing chromium is applied to the valve, such as laser remelting.

Furthermore, the present invention has the objective of providing a valve that offers better wear resistance in general, being capable of resisting intergranular corrosion and subsequent fractures, hot gas corrosion and the formation of combustion chamber leakage.

The subject matter of the present invention is a valve for internal combustion engines provided with a ferrous body comprising chromium in which at least one area of the valve neck comprises a surface layer with a thickness of up to 300 µm, provided with at least 17% solubilized metallic chromium.

The subject matter of the present invention is also a method for obtaining a ferrous valve containing chromium for internal combustion engines comprising the following steps: step i) cutting steel bars, friction welding of a valve body with a valve tip, beating process (up-setting), forging of at least one area of the valve and heat treatment; the method further comprising; the step ii) of applying a surface melting treatment for solubilizing metallic chromium on at least one forged area of the valve.

Finally, the subject matter of the present invention is a valve for internal combustion engines obtained according to the method described above.

BRIEF DESCRIPTION OF THE DRAWINGS

The valve for internal combustion engines may be better understood from the following detailed description which is based on the figures listed below.

DETAILED DESCRIPTION

Figure 1:
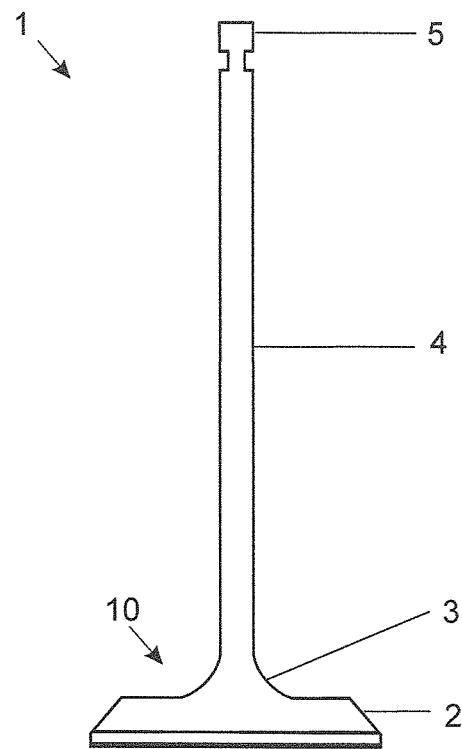
FIG. 1—side view of a valve with all its component parts.

FIG. 1 discloses a valve 1 for use in any internal combustion engine, such as for example, an exhaust valve or an intake valve. This figure illustrates a side view, where the existence of the various parts composing the valve 1 can be clearly seen, consisting of a disc-shaped head 10 comprising a seat area 2 and a neck area 3 that acts as an area of transition to the stem 4, with the tip 5 of the valve 1 being located at the opposite end of the stem 4 to the head 10.

Some examples that affect the durability of valves can be seen in FIGS. 2 to 11. Thus, as pointed out earlier, one of the phenomena that most affects the durability of prior art valves arises from intergranular corrosion (IGC).

Figure 2:
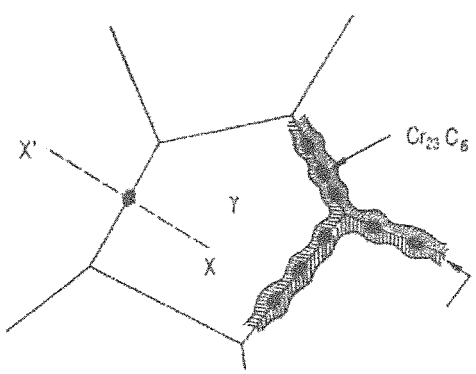
FIG. 2—schematic drawing representing the mechanism of intergranular corrosion by chromium depletion in the grain boundary areas and carbide precipitation in the grain edge areas.
Figure 3:
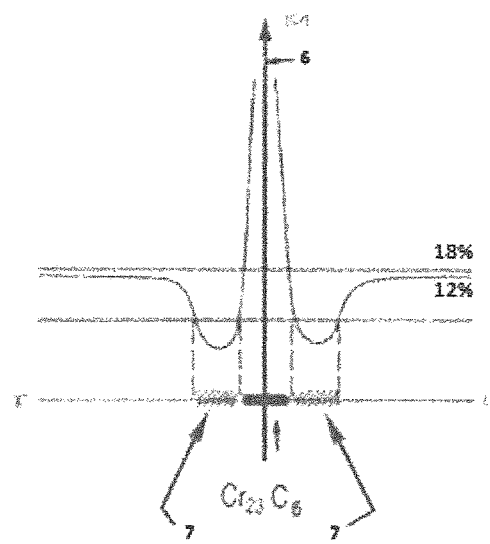
FIG. 3—graph representing the mechanism of intergranular corrosion by chromium depletion in the grain boundary areas and carbide precipitation in the grain edge areas.
Figure 4:
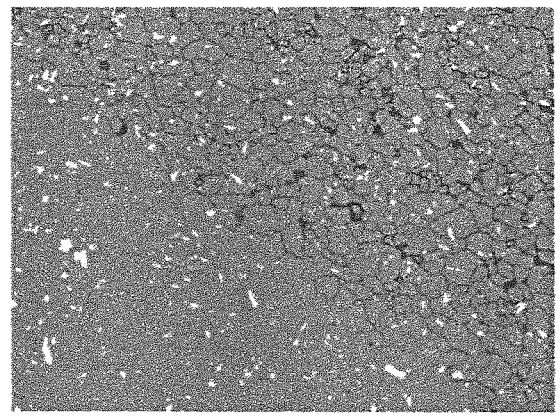
FIG. 4—photograph depicting intergranular corrosion in a prior art valve.

FIGS. 2 and 3 illustrate intergranular corrosion, which may be described as corrosion that begins at the grain edge 6. Due to exposure to high temperature, the chromium of the alloy migrates to the grain edge 6, i.e. the formation occurs of a precipitate of chromium ($Cr_{23}C_6$) in the grain edge 6 area.

As a result, the loss of chromium as an element of the alloy, essential to corrosion resistance, leads to the dissolution of the grain edges 6 and of the adjacent areas 7, (see FIGS. 4, 5, 7 and 8).

Figure 5:
FIG. 5—photograph depicting intergranular corrosion and the occurrence of fractures in a prior art valve.
Figure 6:
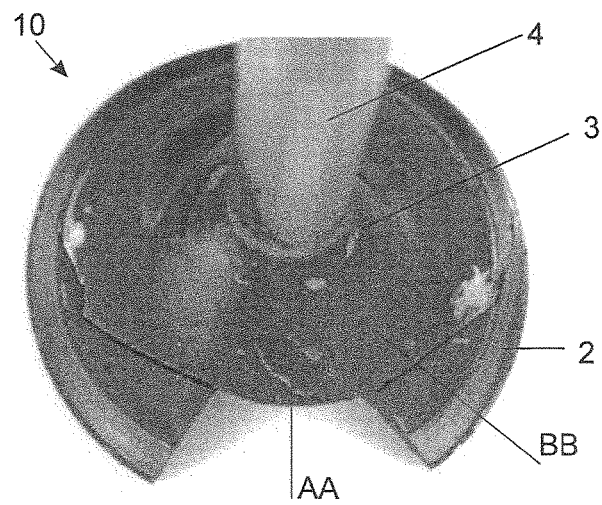
FIG. 6—photograph in perspective of a prior art valve in which part of the head area has been lost due to a major fracture (substantially parallel to the perimeter) and secondary fractures (substantially orthogonal to the perimeter).

The result of such an effect leads to the fracture of the valve as depicted in FIG. 6, which discloses a valve where part of the head area was lost due to a main fracture (substantially parallel to the perimeter—see FIG. 7), as well as displaying secondary fractures (substantially orthogonal to the perimeter—see FIG. 5).

Figure 7:
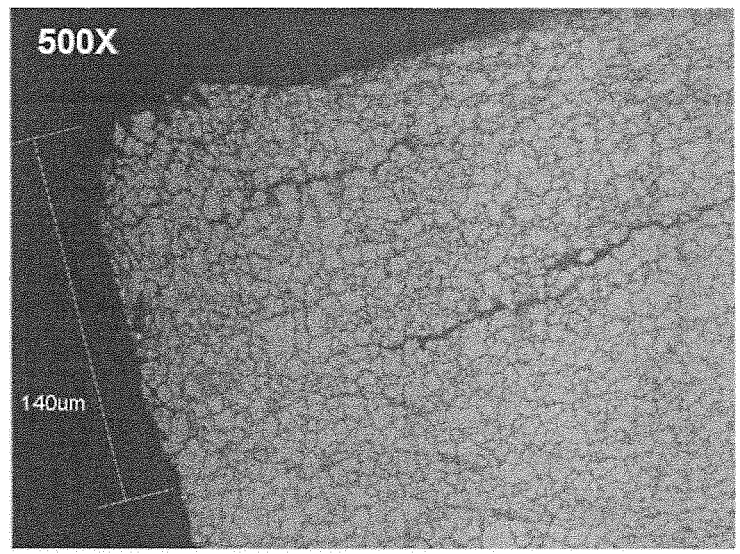
FIG. 7—photograph depicting intergranular corrosion and the removal of some grains in section AA of the valve illustrated in FIG. 6.
Figure 8:
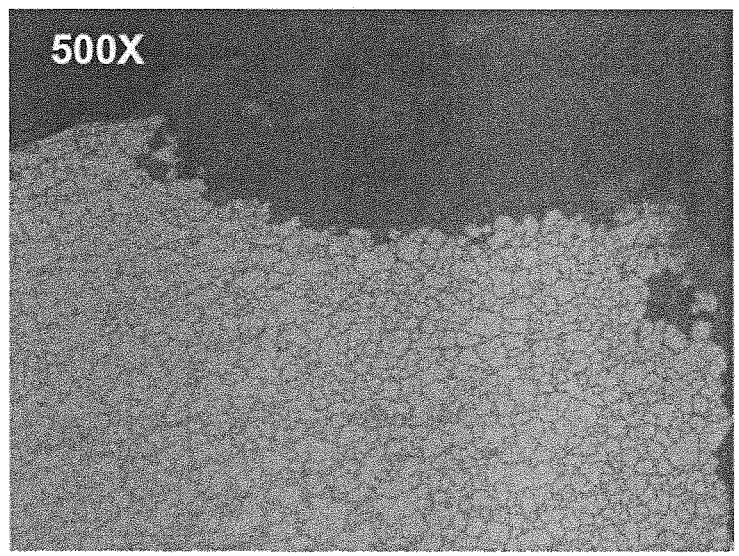
FIG. 8—photograph depicting intergranular corrosion and the removal of material in section BB of the valve illustrated in FIG. 6.
Figure 9:
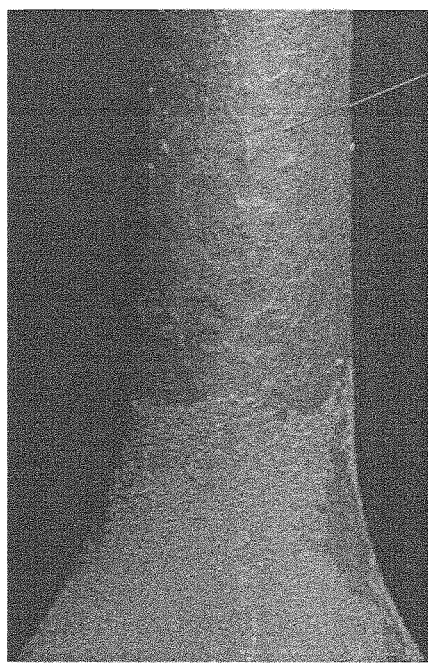
FIG. 9—photograph depicting the stem area of a prior art valve after hot gas corrosion.
Figure 10:
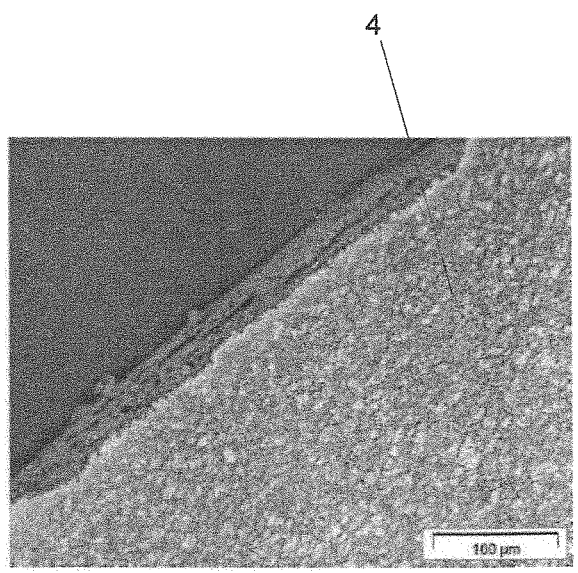
FIG. 10—photograph depicting the stem area of a prior art valve after hot gas corrosion and consequent removal of material.
Figure 11:
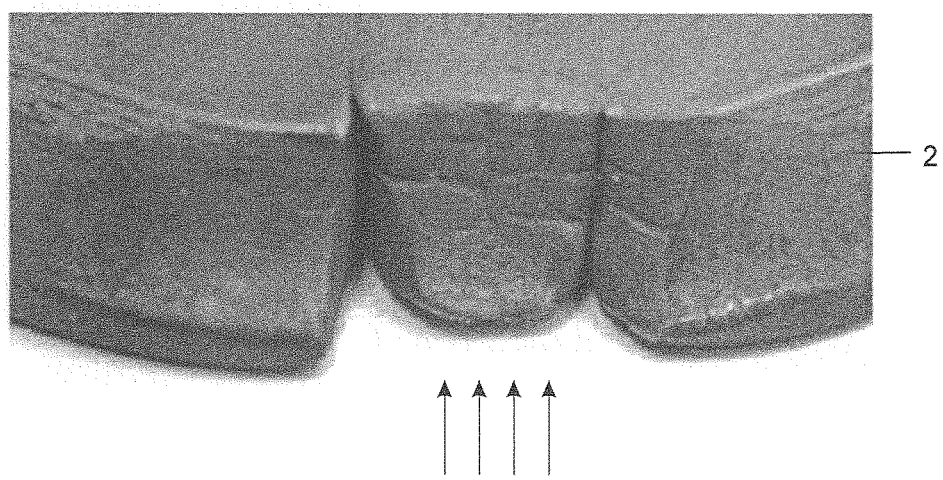
FIG. 11—photograph depicting the head area of a prior art valve after corrosion through the passage of hot gases by combustion and consequent removal of material in the seat area.

After chemical etching and 500 times magnification, a detailed illustration of intergranular corrosion is provided in FIGS. 7 and 8, as well as the removal of some grains in sections AA and BB of FIG. 6, respectively.

The surface melting treatment by laser remelting applied to the area of the neck 3 of the valve 1 can desensitize steels and improve resistance to intergranular corrosion, through the formation of fine dendritic structures.

The improvement in resistance to intergranular corrosion is attributed to the dissolution of chromium carbides ($Cr_{23}C_6$) and to the homogenization of chromium depleted areas. Since the surface melting treatment, e.g. by a laser remelting process occurs in a short space of time and only on the surface of the component, a sudden cooling occurs, producing a new solidification with a high temper level, sufficiently rapid to prevent the resensitization of the surface.

Compressive stresses are also developed in this surface melting treatment, which leads to resistance to IGSCC (InterGranular Stress Corrosion Cracking) also being improved.

The fine dendritic cell structure obtained through surface melting treatment by laser remelting causes the valve 1 to be capable of resisting intergranular corrosion and keeping its properties throughout the useful life of the internal combustion engine. On the other hand, this change in surface structure does not critically affect the mechanical properties of the valve 1, such as fatigue strength.

Laser surface remelting treatment can be applied to any area of the valve, preferably, but not necessarily, applied in the area of the neck 3 which, as already discussed, is the area where corrosion preferentially occurs. As a result, a valve is obtained for internal combustion engines provided with a ferrous body comprising at least in the area of the neck 3 of the valve 1 a surface layer with a thickness of up to 300 µm, with at least 17% solubilized metallic chromium.

Optionally, any method may be applied that ensures sensitization of the metallic chromium on the surface of the valve so as to ensure the same technical effect described above.

If the method of solubilization of metallic chromium is applied by laser remelting, the area where such a method is applied will result in a dendritic structure.

The present invention thus manages to anticipate and provide the characteristics of mechanical strength initially specified when a steel is selected that is stainless in behaviour, thermal and chemical for the operating parts of the valve 1 by enabling, after the plastic transformation process to which the valve is subjected, a valve to be produced that is capable of offering the necessary resistance to corrosion, in particular by hot gases.

In a first preferred configuration, such a method for obtaining a ferrous valve 1 containing chromium (17% or more) for internal combustion engines comprises the following steps:

- step i) cutting steel bars, friction welding of a valve body with a valve tip, process of beating (up-setting), forging of at least one area of the valve 1 and heat treatment, the method 10 being characterized in that it further comprises the following step:
- step ii) applying a surface melting treatment for solubilizing metallic chromium in at least one forged area of the valve 1.

It should be further noted that the valve derived from the present invention will receive the treatment described above up to 300 μm from the surface. In an alternative configuration, the thickness of the treatment will be up to 200 μm. In another configuration, the thickness of the treatment will be up to 100 μm. It should be noted that the solubilized metallic chromium with a content of 17% or more will thus be found in surface thicknesses of up to 300 μm, preferably in a thickness of up to 200 μm, preferably in a thickness of up to 100 μm.

Thus, the focus of the present invention will always be the solubilization of metallic chromium in the areas of the valve 1 that have undergone plastic transformation, so that such areas contain at least 17% chromium for offering the necessary corrosion resistance. Naturally, the valves of the present invention will have a lower unit cost than the prior art solutions capable of achieving equivalent results.

This stems from the fact that the valve of the present invention is based on a cheaper raw material and a simple, fast and economic method, which at the same time improves the properties of the valve at a reduced cost.

While one example of a preferred embodiment has been described, it should be understood that the scope of the present invention includes other possible variations, with the purpose of improving the characteristics of resistance to wear and to corrosion and the reduction of frictional forces, being limited only by the content of the appended claims, including the possible equivalents therein.

The invention claimed is:

1. A method for obtaining a ferrous valve containing chromium for internal combustion engines comprising:
   cutting steel bars,
   friction welding of a valve body with a valve tip,
   beating the valve body,
   forging of at least one area of the valve and,
   applying a heat treatment,
   applying a surface melting treatment for solubilizing metallic chromium in the at least one forged area of the valve, and
   wherein the surface melting treatment reaches a temperature of up to 500 C and results in the at least one forged area of the valve having a hardness of approximately 100 Hs.

2. A method according to claim 1, wherein the surface melting treatment takes place by laser remelting.

3. A method according to claim 1, wherein the surface melting treatment occurs in a thickness of up to 300 μm.

4. A method according to claim 3, wherein the surface melting treatment occurs in a thickness of up to 200 μm.

5. A method according to claim 4, wherein the surface melting treatment occurs in a thickness of up to 100 μm.

6. A method according to claim 1, wherein the at least one forged area is at least one area of a neck of the valve.

7. A method according to claim 6, wherein the at least one area of the neck contains at least 17% chromium.

8. A method according to claim 1, wherein the at least one forged area contains at least 17% chromium.

9. A method according to claim 8, wherein the at least 17% chromium is solubilized metallic chromium.

10. A method according to claim 1, wherein the at least one forged area is provided with a dendritic structure.

* * * * *